United States Patent
D'Harcourt et al.

(10) Patent No.: US 8,448,680 B2
(45) Date of Patent: May 28, 2013

(54) TYRE PROVIDED WITH AN EXPELLED-WATER DEFLECTOR DEVICE

(75) Inventors: Jean-Marc D'Harcourt, Clermont-Ferranderrand (FR); Fabien Sonilhac, Loubeyrat (FR)

(73) Assignees: Compagnie Generale des Etablissements Michelin, Clermont-Ferrand (FR); Michelin Recherche et Technique S.A., Granges-Paccot (CH)

( * ) Notice: Subject to any disclaimer, the term of this patent is extended or adjusted under 35 U.S.C. 154(b) by 395 days.

(21) Appl. No.: 12/601,766

(22) PCT Filed: Jun. 2, 2008

(86) PCT No.: PCT/EP2008/056747
§ 371 (c)(1),
(2), (4) Date: Apr. 20, 2010

(87) PCT Pub. No.: WO2008/145752
PCT Pub. Date: Dec. 4, 2008

(65) Prior Publication Data
US 2010/0218866 A1    Sep. 2, 2010

(30) Foreign Application Priority Data
Jun. 1, 2007  (FR) .................................... 07 03930

(51) Int. Cl.
*B60C 11/01*   (2006.01)
*B60C 13/02*   (2006.01)

(52) U.S. Cl.
USPC .................. 152/154; 152/209.16; 152/523

(58) Field of Classification Search
USPC ............... 152/154, 209.16, 523; D12/605
See application file for complete search history.

(56) References Cited

U.S. PATENT DOCUMENTS 3,568,747 A  *  3/1971  Fletcher et al. ............... 152/154
4,284,302 A  *  8/1981  Drews ........................ 296/181.5

(Continued)

FOREIGN PATENT DOCUMENTS

| EP | 1 048 489 A1 | 11/2000 |
|---|---|---|
| FR | 83.303 E | 7/1964 |

(Continued)

OTHER PUBLICATIONS

English machine translation of FR2214602, Aug. 1974.*

(Continued)

*Primary Examiner* — Steven D Maki
*Assistant Examiner* — Robert Dye
(74) *Attorney, Agent, or Firm* — Buchanan Ingersoll & Rooney PC

(57) ABSTRACT

Tire having a tread, sidewalls axially and radially extending towards the inside of the tread, the tread having a running surface, intended to be in contact with the ground during running, and axially lateral faces on either side of the tread, this tire having, furthermore, at least on one of the sidewalls and near the tread, a circumferential rib intended to modify the height of expelled water in the transverse direction (corresponding to a direction parallel to the rotation axis of the tire) in the case of the tire running on wet ground. The circumferential rib comprises a deflector device for deflecting the stream of expelled water in the case of the tire running on water-covered ground, this deflector device being formed from a plurality of protuberances projecting from the circumferential rib and being arranged in an oblique direction with respect to the transverse direction. The circumferential rib further includes a plurality of studs for reducing the power of the stream when the tire is running on water-covered ground, these studs being placed between the protuberances of the deflector device.

3 Claims, 2 Drawing Sheets

U.S. PATENT DOCUMENTS

| | | | |
|---|---|---|---|
| 4,881,586 | A | 11/1989 | Shinomiya |
| 6,460,584 | B1 | 10/2002 | de Labareyre |
| 7,497,240 | B2 * | 3/2009 | Zimmer et al. .......... 152/209.19 |
| 2008/0110543 | A1 * | 5/2008 | Song et al. .................... 152/523 |
| 2010/0230027 | A1 * | 9/2010 | D'Harcourt et al. .......... 152/523 |

FOREIGN PATENT DOCUMENTS

| | | | |
|---|---|---|---|
| FR | 2 214 602 A | | 8/1974 |
| JP | 2006-130838 | * | 5/2006 |
| JP | 2007-245945 | * | 9/2007 |
| JP | 2007-297035 | * | 11/2007 |

OTHER PUBLICATIONS

International Search Report (PCT/ISA/210) dated Aug. 25, 2008 from PCT/EP2008/056747.

* cited by examiner

TYRE PROVIDED WITH AN EXPELLED-WATER DEFLECTOR DEVICE

The invention relates to tyres for heavy-goods road vehicles and in particular tyres that are provided with devices for deflecting laterally expelled water when a vehicle equipped with said tyres runs on a roadway covered with water.

When driving in rainy weather, the maneuvers of passing or overtaking a heavy-goods vehicle are often very fraught for the other road users because of the large amount of water that may be laterally expelled by said vehicle, which water, on reaching the windscreens of the other vehicles, considerably reduces the visibility of their drivers.

A heavy-goods vehicle tyre is in general made up of two beads intended to be in contact with a wheel rim, a crown provided with a tread having a running surface, intended to come into contact with the ground when the vehicle is running, and two sidewalls for joining this tread to the beads.

Such a tyre is reinforced by a carcass reinforcement extending from one bead to the other and by a crown reinforcement located radially to the outside of the carcass reinforcement, this crown reinforcement comprising at least two superposed reinforcing plies, i.e. plies placed one on top of another in the radial direction. Each ply of the crown reinforcement is in general made up of a plurality of reinforcing members placed so as to make an angle ranging from 0° to 70° with the circumferential direction. However, it is not excluded for the angle of the reinforcing members to be greater than 70°.

The tread of a heavy-goods vehicle tyre is as a general rule provided with a tread pattern formed from raised elements bounded by cuts (grooves and/or incisions) designed to give the tyre grip on a wet road, in particular allowing water to be expelled.

The tyre has a maximum width dimension L measured at its sidewalls when it is fitted onto its fitting wheel and subjected to the nominal pressure and load conditions when it is in use (L represents the maximum distance between the points on the sidewalls of the tyre that are axially furthest apart). The term "axially" denotes here a direction parallel to the axis of rotation of the rim-fitted tyre.

European Patent EP 1 048 489 discloses the use of a device that substantially modifies the height of the laterally expelled water when the vehicle is running on a roadway covered with water. This device comprises, on at least one of the sidewalls of the tyre, at least one circumferential rib made of a rubber compound, this rib being placed on the tyre sidewall located on the side to the outside of the vehicle.

The purpose of this protuberance is to lower the path of the stream of liquid expelled by the running tyre towards the roadway so as to prevent this stream from being expelled excessively upwards, forming a spray that hampers the other road users.

The solution described in that patent makes it possible to limit the temperature rise within the tread and especially near the ends of the crown reinforcement plies.

However, it appears that, when in use, the device described in that patent can be further improved. This is because it has been found that the deflected stream could be perceived as being too powerful and could then reach quite large distances in a transverse direction (i.e. parallel to the rotational axis of the tyre).

The tyre of the invention seeks to improve this state of affairs by proposing a solution which, while still reducing the height of the lateral jet of liquid when running on a roadway covered with water, directs this jet differently and reduces the power of this jet and limits the power of the laterally expelled water making an angle with the axial direction.

For this purpose, a heavy-goods vehicle tyre according to the invention comprises a tread, sidewalls axially and radially extending towards the inside of the tread (the expression "radially towards the inside" is understood here to mean in a direction along the rotation axis of the tyre), the tread having a running surface, intended to be in contact with the ground during running, and axially lateral faces on either side of the tread, this tyre having, furthermore, at least on one of its sidewalls and near the tread, an anti-water expulsion device for preventing spray in the transverse direction (corresponding to a direction parallel to the rotation axis of the tyre) when the vehicle is running in wet weather on a roadway covered with water. This anti-expulsion device is formed from a circumferential rib intended to modify the height of the expelled water (in fact, this circumferential rib may consist of a single circumferentially continuous rib or else several discontinuous ribs coming one after another in the circumferential direction).

The circumferential rib has an external wall formed from a first wall surface and a second wall surface, the first wall surface extending between a sidewall of the tyre and a circumferential line connecting the axially outermost points of the circumferential rib, the second wall surface being in the extension of the first wall surface and extending radially outwards until joining with a lateral face of the tread. The circumferential rib further comprises a deflector device for deflecting the stream of expelled water in the case of the tyre running on water-covered ground, this deflector device being formed from a plurality of protuberances projecting from the second wall surface of the circumferential rib, these protuberances being arranged so as to direct the stream of expelled water mostly, or even entirely, in a main direction different from the transverse direction. In addition, the circumferential rib provided with a deflector device further includes a plurality of studs for reducing the power of the stream when the tyre is running on water-covered ground, these studs being placed between the protuberances of the deflector device. The expression "main direction different from the transverse direction" is understood to mean here that the direction of most of the water expelled axially beyond the deflector device makes an angle which is greater than 0° with the rotation axis of the tyre.

The effect of the plurality of rubber studs placed between the protuberances of the deflector device is to limit the power of the laterally expelled water making an angle with the axial direction.

Preferably, each protuberance formed on the second wall surface of the circumferential rib is designed so as to direct the stream of expelled water at an angle of at least 30° with the transverse direction (i.e. a direction parallel to the rotation axis of the tyre).

To prevent as far as possible any expulsion in a direction parallel to the rotation axis, it is advantageous for the deflector device to comprise a plurality of small ribs making an average angle of greater than 30° with the axial direction.

In an advantageous embodiment, these small ribs are offset in the circumferential direction so that any plane containing the rotation axis passes through at least two ribs of the deflector device. These small ribs form a set of blades which, by passing close to the contact region of the tyre with the roadway, serve to remove and direct the water expelled laterally by the tyre tread in contact with the water-covered roadway.

Each small rib of the deflector device has lateral faces, at least one of which has an average angle of inclination, to the transverse direction of the tyre, which is appropriate for deflecting the stream of water from the transverse direction. In one embodiment of the deflector device, each small rib has a symmetrical shape on either side of a plane passing through the rotation axis of the tyre and has lateral walls having geometries capable of directing most of the stream of expelled liquid in at least one direction different from the transverse direction at the moment when the tyre comes into contact with the roadway.

In one embodiment of the deflector device, each protuberance is formed from several studs made of a rubber compound projecting from the second wall surface of the circumferential rib, these rubber studs being placed so as to allow expulsion in a direction different from that of the rotation axis of the tyre. These protuberances, while still directing the stream, also serve for substantially reducing the power thereof.

In all these embodiments of the invention, each protuberance or stud is an element made of a rubber material which may or may not be of the same nature as the material forming the circumferential rib provided on the sidewall.

The protuberances, when running, may or may not touch the roadway when the tyre is new and when it is supporting its nominal load and is inflated to its nominal pressure. They may be intended to wear away with the tread while still maintaining their role even after partial wear so as to have a long-lasting device.

When the tyre includes a crown reinforcement located radially to the outside of the carcass reinforcement, this crown reinforcement comprising at least two superposed plies, each ply being provided with reinforcing members in the form of threads or cords, it is judicious to apply the teaching of Patent EP 1 048 489. In this case, each circumferential rib meets the requirements mentioned in that patent.

In this way, it is in fact possible both to achieve a substantial reduction in the power of the expelled water while still limiting the temperature rise near the ends of the plies as a result of adding rubber material.

Preferably, the tyres according to the invention are mounted on the front axle of the vehicles.

The invention will be more clearly understood with the aid of the figures appended to the present description and showing embodiments given by way of non-limiting examples:

To make the figures in combination with the corresponding description easier to understand, the same structural elements shown in these figures are denoted by the same reference signs.

Figure 1:
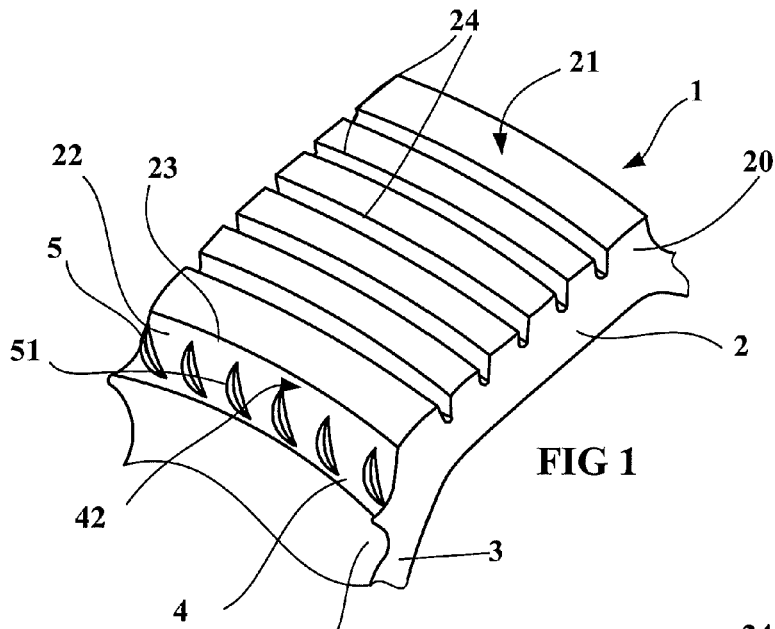
FIG. 1 shows a portion of a tyre provided on an axially external side with a deflector device according to the prior art.

FIG. 1 shows a partial section of a heavy-goods vehicle tyre 1 according to the invention. This section is produced in a meridional section plane, i.e. in a plane containing the rotation axis of the tyre (this axis is parallel to the direction shown by the line XX' in FIG. 2). This tyre 1 comprises a crown region 2 connected to beads (not shown here) by sidewalls 3.

The crown 2 of the tyre comprises a tread 20 bounded radially to the outside by a running surface 21, this running surface being intended to come into contact with the roadway while the tyre is running, and lateral faces 22. The intersection of the running surface 21 with each lateral face 22 forms an intersecting edge 23. The tread 20 is provided with several circumferential grooves 24 for promoting water to be expelled towards the rear of the tyre as it runs on a water-covered ground.

Notwithstanding the presence of these circumferential grooves, it has been found that some of the water is expelled in a transverse direction (i.e. parallel to the rotation axis of the tyre). To prevent this lateral expulsion from rising too high and hampering the other users of the road, the tyre 1 is provided on at least one of its sidewalls with a continuous circumferential rib 4 projecting to the outside of the tyre (by definition, the inside of the tyre corresponds to the tyre cavity in which the inflation pressure is exerted). The circumferential rib 4 is in the present case produced by moulding at the same time as the tyre 1 is moulded and vulcanized.

This circumferential rib 4 has an external wall formed from a first wall surface and a second wall surface, the first wall surface 41 extending between the sidewall 3 of the tyre and a circumferential line connecting the axially outermost points A of the circumferential rib 4, the second wall surface 42 being in the extension of the first wall surface 41 and extending radially outwards until it joins with a lateral face 22 of the tread 20. This circumferential rib 4 includes, on its second wall surface 42, a deflector device 5 for deflecting the stream of expelled water when the tyre is running on water-covered ground, this deflector device 5 being formed from a plurality of ribs 51 projecting from this second wall surface 42.

In the present case, each rib 51 takes the form of a small rib profiled so as to direct the stream of expelled water at an angle of 45° to a direction parallel to the axial direction of the tyre.

Figure 2:
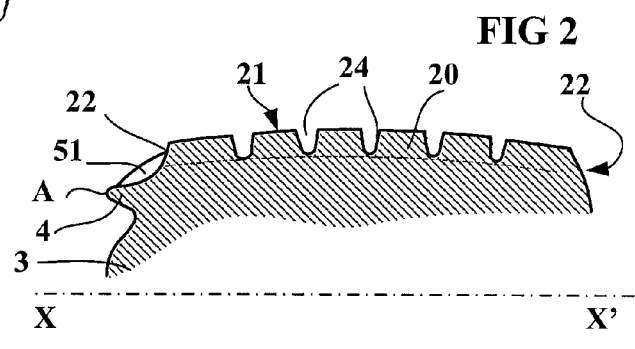
FIG. 2 shows a schematic meridional section of the tyre shown in FIG. 1.

FIG. 2 shows, in a meridional section plane (i.e. in a plane containing the rotation axis of the tyre), a partial view of the tyre as shown in FIG. 1. In this FIG. 2, the tread 20 bounded by its running surface 21 and its two lateral faces 22 may be distinguished. Five ribs 24 form channels for removing the water in the circumferential direction.

On a sidewall 3 of the tyre, the circumferential rib 4 is provided on its second wall surface 42 with a plurality of small ribs 51 forming, with the circumferential rib 4, a kind of bladed wheel. That side on which the rib is placed is of course intended to be placed to the outside of the vehicle.

Figure 3:
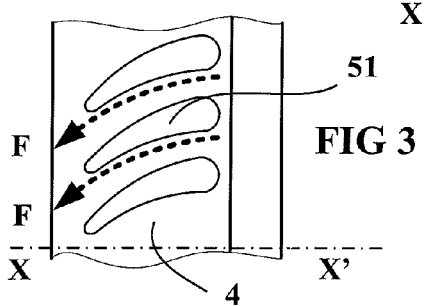
FIG. 3 shows, in side view, the deflector device shown in FIGS. 1 and 2.

As shown in particular in FIG. 3, the stream of expelled water, seen in a region close to the point of contact of the tyre with the road, is directed by the small ribs 51 along directions indicated by the dotted arrows F. The directions of these arrows F at the axially outermost point of the tyre make an average angle greater than zero degrees with the transverse direction represented by the direction XX' in FIG. 3 (this direction is parallel to the rotation axis of the tyre).

Figure 4:
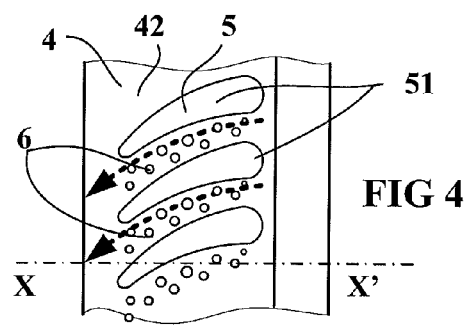
FIG. 4 shows an alternative embodiment according to the invention comprising, apart from a deflector device, a plurality of elements for reducing the power of the expelled stream.
Figure 5:
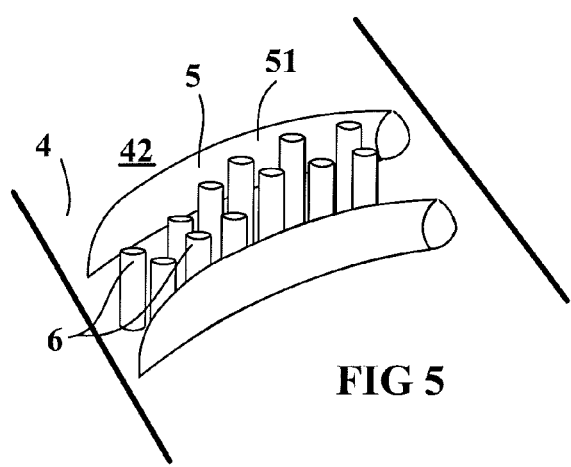
FIG. 5 shows a perspective view of the alternative embodiment of FIG. 4.

In order to substantially reduce the power of the expelled water while orienting it in a direction other than the axial direction, a plurality of rubber studs 6 projecting from the second wall surface 42 of the circumferential rib 4 are inserted in the gaps between the small ribs 51 of the deflector device 5, as shown in FIG. 4 representing a tyre according to the invention. According to this FIG. 4, the tyre according to the invention assumes in particular the features of the tyre shown in FIGS. 1 to 3 with the addition of the rubber studs 6 intended for substantially reducing the power of the laterally expelled water. These rubber studs 6 have an appropriate flexibility and an appropriate spacing so as, however, to let through the water which is directed by the small ribs 51. In the present case, the rubber studs 6 are cylindrical in shape and extend radially from the circumferential rib 4 over a height of at least 50% of the average height of the ribs 51 of the deflector device as can be seen in FIG. 5 showing a perspective view of the alternative embodiment shown in FIG. 4.

Figure 6:
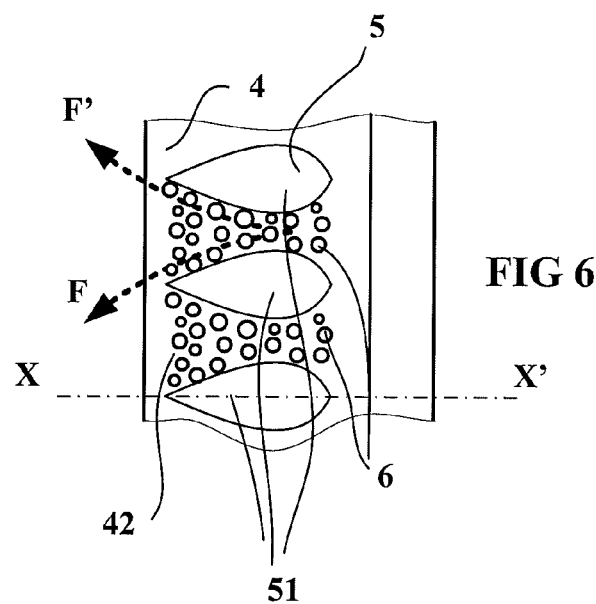
FIG. 6 shows, in side view, another alternative embodiment according to which the deflector device is formed by a plurality of studs.

In another alternative embodiment of the invention, shown in FIG. 6, the small ribs 51 of the deflector device 5 moulded on the external wall surface 42 of the rib 4 of a tyre have a shape approximately symmetrical with respect to a plane containing the rotation axis XX' of the tyre. This shape is capable of directing, on either side of each small rib 51, the stream along two directions different from the transverse direction (these being identified in FIG. 6 by the two arrows F and F'). A plurality of rubber studs 6 are provided between the ribs 51 in order to reduce the power of the laterally expelled water.

Figure 7:
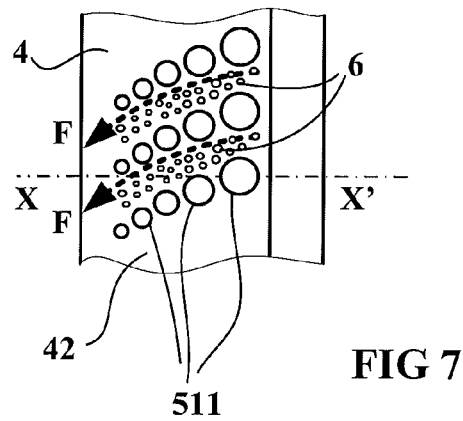
FIG. 7 shows a cross-sectional view of a tyre according to the alternative embodiment shown in FIG. 6.

In an alternative embodiment according to the invention shown in FIG. 7, the deflector device 5 is formed from a plurality of rubber studs 511 projecting from the second wall surface 42 of the circumferential rib 4. According to this alternative embodiment, the studs 511 of the deflector device are grouped together appropriately so as to deflect the laterally expelled water away from the axial direction XX'. According to this alternative embodiment, the centres of the stud cross sections are arranged on a curved line which is approximately parallel to the flow lines of the transversely expelled water that are shown by the arrows F. Moreover, the studs 511 decrease both in height and in cross section upon going axially from the inside of the tyre towards the outside (of course, alternative embodiments whereby the cross sections of the studs are all the same or else vary in the opposite direction also fall within the present invention). In the spaces between the studs 511 may be distinguished a plurality of studs 6 for reducing the power of the expelled water having dimensions and a stiffness that are suitable for bending under the effect of the expelled water. In contrast, the studs 511 of the deflector device have stiffnesses that are suitable for not bending under the effect of the expelled water and that thus allow the path of the expelled water to be modified.

Of course, to benefit from the effects of the invention when the tyre according to the invention is running, it is mounted on a vehicle so that the sidewall provided with a rib and with an expelled-water deflector device is placed on the outside of said vehicle (i.e. visible on the outside of the vehicle).

All the embodiments described employ a continuous circumferential rib. Of course, it is possible to mould a discontinuous circumferential rib as a succession of rib portions, each rib portion being provided with an expelled-water deflector device according to the invention.

The invention is not limited to the examples described and shown, and various modifications may be made thereto without departing from the scope of the invention.

The invention claimed is:

1. A tire having a tread, sidewalls axially and radially extending towards the inside of the tread, the tread having a running surface, intended to be in contact with the ground during running, and axially lateral faces on either side of the tread, this tire having, furthermore, at least on one of the sidewalls and near the tread, a circumferential rib intended to modify the height of expelled water in the transverse direction (corresponding to a direction parallel to the rotation axis of the tire) in the case of the tire running on wet ground, this circumferential rib having an external wall formed from a first wall surface and a second wall surface, the first wall surface extending between a sidewall of the tire and a circumferential line connecting the axially outermost points of the circumferential rib, the second wall surface being in the extension of the first wall surface and extending radially outwards until joining with a lateral face of the tread, the circumferential rib comprises a deflector device for deflecting the stream of expelled water in the case of the tire running on water-covered ground, this deflector device being formed from a plurality of protuberances projecting from the second wall surface of the circumferential rib, these protuberances being arranged so as to direct the stream of expelled water in a main direction at an angle of at least 30° from the transverse direction, wherein each protuberance is formed from several studs of a rubber compound projecting from the second wall surface of the circumferential rib, wherein the circumferential rib provided with a deflector device further includes a plurality of studs for reducing the power of the stream when the tire is running on water-covered ground, these studs being placed between the protuberances of the deflector device.

2. The tire according to claim 1 wherein the deflector device comprises a plurality of small ribs making an average angle greater than 30° with the transverse direction, these small ribs being offset in the circumferential direction so that any radial plane, i.e. any plane containing the rotational axis, passes through at least two ribs of the deflector device.

3. The tire according to claim 1 wherein each protuberance placed on the second wall surface of the circumferential rib has lateral walls, the geometries of which are capable of directing most of the stream of expelled liquid in at least one direction different from the transverse direction.

* * * * *